Feb. 27, 1923.

J. A. MERTZ ET AL

ANIMAL TRAP

Filed Jan. 3, 1922

1,446,715

Inventors
James A. Mertz
Frank Priestley
By Bair & Freeman Attys

Witness
Lynn Latta

Patented Feb. 27, 1923.

1,446,715

UNITED STATES PATENT OFFICE.

JAMES A. MERTZ, OF WEBSTER CITY, IOWA, AND FRANK PRIESTLEY, OF MOUNTAIN GROVE, MISSOURI.

ANIMAL TRAP.

Application filed January 3, 1922. Serial No. 526,826.

*To all whom it may concern:*

Be it known that we, JAMES A. MERTZ and FRANK PRIESTLEY, citizens of the United States, residing at Webster City, in the county of Hamilton and State of Iowa, and at Mountain Grove, in the county of Wright and State of Missouri, respectively, have invented a certain new and useful Animal Trap, of which the following is a specification.

The object of our invention is to provide an animal trap of simple, cheap and durable construction.

A further object is to provide such a trap of a spring actuated type, having a movable jaw and being so constructed and arranged that the tray may be set with the jaw open and spring held under tension by a trigger structure without placing the fingers between the jaws where they are likely to be caught and pinched when the trap is being set.

Another object is to provide such a trap, which is provided with engaging members so arranged that the trap may be conveniently released after it has been sprung without touching the animal which may have been caught.

Still another object is to provide such a trap having its parts so constructed and arranged that the trap may be conveniently made of metal parts, so that it will be especially durable and may be placed in boiling water for sterilizing it without injury to the trap.

With these and other objects in view, our invention consists in the construction, arrangement and combination of the various parts of our device, whereby the objects contemplated are attained, as hereinafter more fully set forth, pointed out in our claim, and illustrated in the accompanying drawings, in which:

Figure 1:
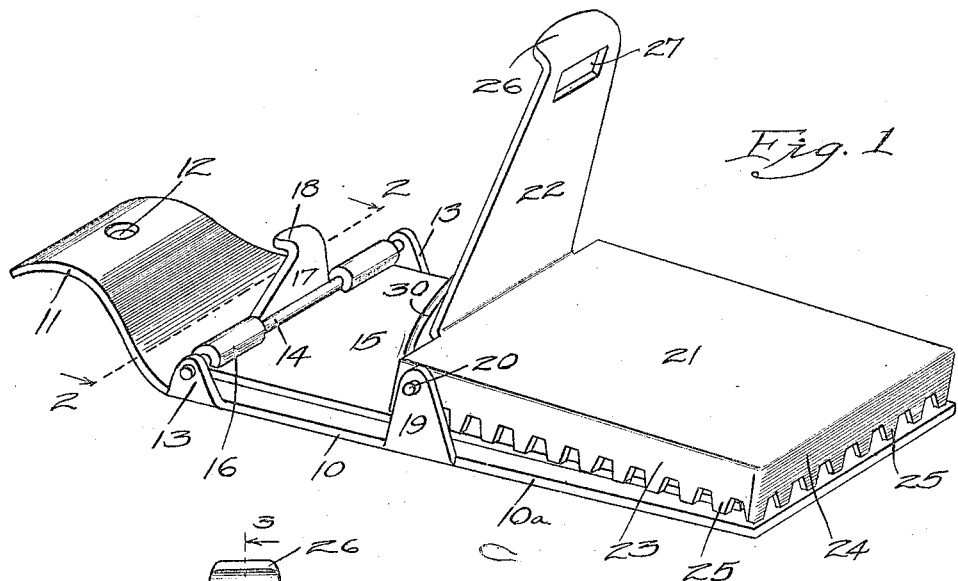
Figure 1 shows a perspective view of a trap embodying our invention.
Figure 2:
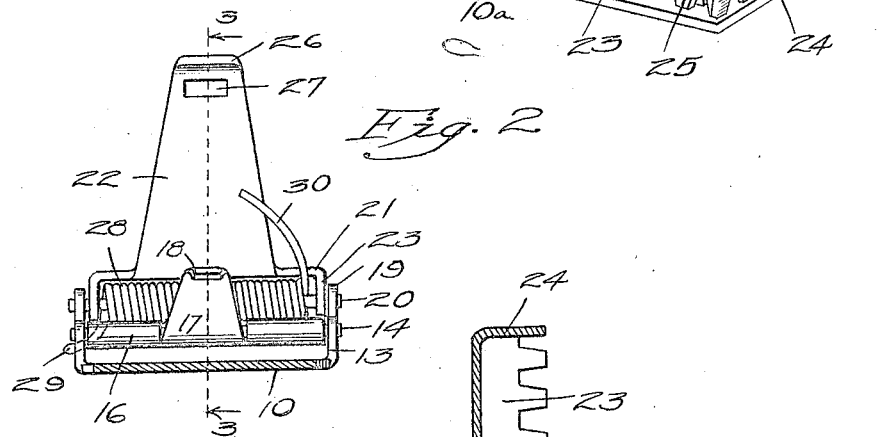
Figure 2 shows a detailed sectional view taken on the line 2—2 of Figure 1

In the accompanying drawings I have used the reference numeral 10 to indicate a plate which forms the body of our trap and one jaw thereof, the latter being indicated at $10^a$.

Figure 3:
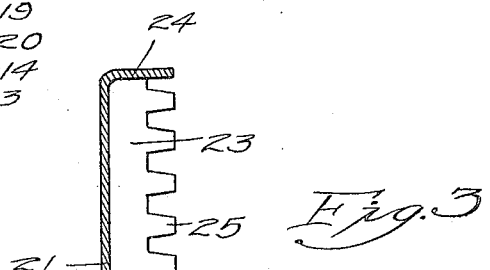
Figure 3 shows a sectional view taken on the line 3—3 of Figure 2 with the trap set.

At the opposite end of the body $10^a$ from the jaw $10^a$ is a curved extension 11 which is curved upwardly and away from the body 10 and then downwardly as illustrated in Figures 1 and 3. In the curved extension 11 is a hole 12 which serves for hanging up the trap.

The body 10 is provided at its side edges near the extension 11 with upwardly extending ears 13. In the ears 13 is mounted a shaft on pintle 14. A trigger plate 15 is arranged above the jaw $10^a$ and body 10 as shown in Figures 1 and 3, and is journalled on rod 14 by suitable means, such for instance, as, the members 16 formed on the plate 15 and curved around the shaft 14.

The plate 15 has just rearwardly of the shaft 14 an extension 17, which is inclined upwardly when the plate 15 rests on the jaw $10^a$, and has at its upper end a rearwardly inclined engaging member 18.

At the sides of the body 10, spaced forwardly from the ears 13 are upwardly extending ears 19.

The movable jaw of the trap is pivoted to the ears 19 by some suitable means such, for instance, as the shaft 20. The movable jaw may be made in any suitable form, which should have a jaw member such, for instance, as the plate 21 and a handle member 22 inclined at a substantial angle with relation thereto.

In the form of the invention disclosed in the drawings, the plate 21 has at its sides and its forward edge, downwardly inclined walls 23 and 24 which, as illustrated, are provided with teeth 25.

At the outer end of the handle 22 is a portion 26 inclined away from the handle 22 as shown, for instance, in Figure 1. In the handle 22 near the outer end thereof is an opening 27. On the shaft 20 is mounted a coil spring 28, having a portion 29 which is extended around one ear 19 and another portion 30, which engages the rear face of the handle 22, in such manner that the spring is under tension (for holding the jaws 21 and $10^a$ together.

The spring 28 is also so arranged that its tension is increased as the jaw 21 is moved toward the position it assumes when the trap is set.

The trigger plate 15 has a pointed member or the like 31 in front of the shaft 20 as shown in Figure 3.

In setting the trap, the user presses the handle 22 rearwardly and downwardly and causes the extension 18 to be received in the opening 27. The spring 28 tends to move the jaw 21 toward engaging position with the relation to the jaw 10ᵃ. The tension of the spring will properly hold the trap in its set position illustrated, in Figure 3.

Bait 32 shown by dotted lines in Figure 3 may be placed on the pointed member 31. The setting of the trap may be done with one hand and the trap can be held by means of the handle 22 in open or set position, while the bait is being placed in position. It will be seen that the setting of the trap may be accomplished without danger of pinching the hands of the user and that the bait may be installed while the trap is easily held in open position.

The construction of the plate 15 and the extension 17 and engaging member 18 is such that when the trap is set the plate 15 is slightly raised, as shown in Figure 3. When an animal steps on the plate 15, in order to reach the bait 32 the engaging member 18 is moved forwardly so that it clears the edges of the opening 27 for permitting the spring 28 to cause the movable jaw to snap to closed position.

An animal which has been caught in the trap may be released from the jaws without the necessity of touching the animal on account of the arrangement of the handle 22 and the extension 11 which also serves as the handle. A chain may be secured to the extension 11 if desired.

It will be seen that the construction of our trap is such that it can be readily made of metal and hence can be scalded or otherwise disinfected without injury.

It will be noted that we have provided a humane animal trap by so constructing and arranging the parts, that the neck and back of the animal will be caught, so that the neck and back will be broken and the animal paralyzed, so that death will practically be instantaneous.

The parts are of very simple construction and the trap can be manufactured at small expense.

Some changes may be made in the construction and arrangement of the various parts of the trap without departing from the essential purpose and spirit of our invention, and it is our intention to cover by our claim, any modified forms of structure or points of mechanical improvements, which may be reasonably included within its scope.

We claim as our invention:

A trap comprising a body having a jaw member portion and a rearwardly projecting portion, a jaw member pivoted to the rear part of said first jaw member, comprising a body element having at its sides and front downwardly projecting flanges, said second jaw member having at its rear end a portion extending away from the jaw member at a substantial angle thereto provided with an opening, said platform having an upwardly projecting catch member adapted to coact with said opening and having spaced rearwardly from its forward edge a bait holding element, and yielding means tending to hold said jaws together, said device being so constructed that an animal stepping on said platform to eat the bait will be captured, whether engaged by the flange members of the second jaw member or not when the trap is released.

Des Moines, Iowa, December 17, 1921.

JAMES A. MERTZ.
FRANK PRIESTLEY.